Patented June 30, 1925.

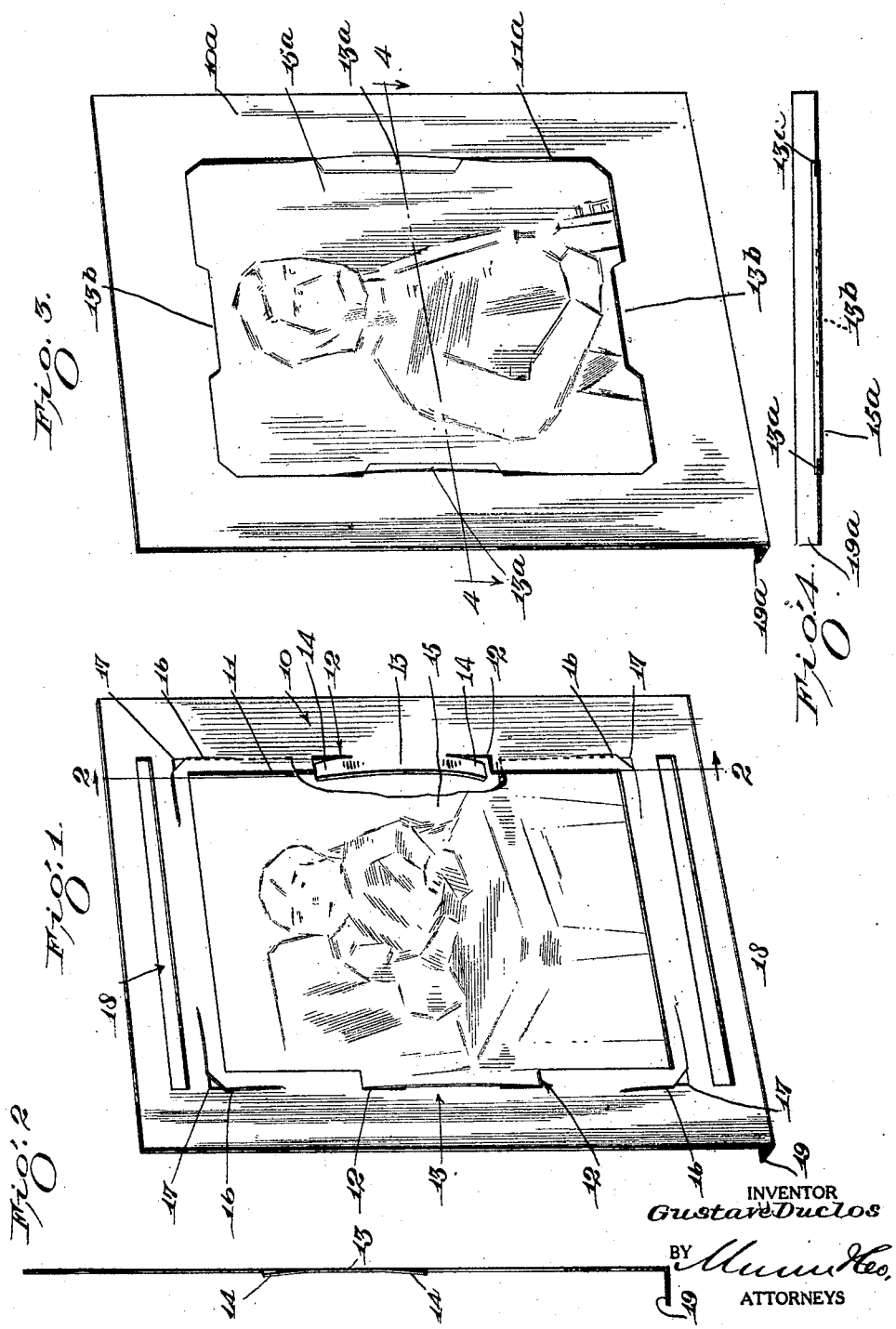

1,544,139

UNITED STATES PATENT OFFICE.

GUSTAVE DUCLOS, OF LOWELL, MASSACHUSETTS.

FILM GRIPPER AND HOLDER.

Application filed August 16, 1924. Serial No. 732,528.

*To all whom it may concern:*

Be it known that I, GUSTAVE DUCLOS, a citizen of the United States, and a resident of Lowell, in the county of Middlesex and State of Massachusetts, have invented certain new and useful Improvements in Film Grippers and Holders, of which the following is a specification.

My present invention relates generally to film holders, and more particularly to a film gripper, my object being the provision of a simple inexpensive device for use by photographers and the like in printing photographs from films whereby to hold the film and prevent the same from displacement, curling or breaking while it is handled and manipulated in the printing of either previously cut films or films in roll form.

Generally speaking my invention proposes a film gripper preferably formed of a thin section of sheet metal provided with a main central film opening and with means at the edges of said opening whereby a film may be gripped and supported, the gripper as a whole forming a frame for the film and engaging the latter in such manner that it is prevented from curling and is while engaged with the gripper maintained in such manner that it may be readily handled as for instance by placing the film within and removing the same from a printing frame and the like.

With the above in mind my invention consists in a film gripper such as shown in the accompanying drawing, forming a part of this specification and wherein, Figure 1 is a perspective view showing my improved film gripper, Figure 2 is a vertical sectional view therethrough taken substantially on line 2—2 of Figure 1 with the film removed, Figure 3 is a perspective view showing a slightly modified form, and Figure 4 is a cross section taken through the form shown in Figure 3.

Referring now to these figures and particularly to Figures 1 and 2 I have shown a film gripper 10 generally of rectangular form, having an enlarged rectangular opening 11 for the film so that the gripper is thus generally of the nature of a frame. This gripper frame is preferably formed of thin sheet metal and has at the opposite sides of its film opening 11 angular slits 12 forming between the slits at each side an inwardly projecting extension 13 whose sides are in the nature of tongues 14 by virtue of the angularity of the slits 12. These slits are adapted to receive the side edges of a film indicated at 15 in Figure 1 and the tongues 14 at the sides of the extensions 13 thus serve to positively engage the film when the side edges of the latter have been placed in the slits 12 so that the film will thus be prevented from shifting as well as from curling.

In order to coact with previously cut films, the gripper frame is also provided adjacent to the corners of its film opening 11, with angular slits 16 adapted to receive the corners 17 of the film, and in order to permit of the use of the gripper with continuous film in roll form, the gripper frame is provided with transverse slots 18 adjacent to the opposite ends of the film opening 11 and extending substantially beyond the sides of said opening so that the film may be passed through these slots 18 with its side edges extending over the inward projections 13 of the frame whereby the film may be gripped at various points and may be shifted lengthwise to bring one image after the other within the film opening 11.

The gripper frame may furthermore be provided at one end with an angular flange 19 adapted to cooperate with a printing frame and the like so that the gripper when placed within the frame with the flange engaging one end of the frame will be assured a position parallel to the axis of the printing frame.

According to Figures 3 and 4 the portions of the gripper frame 10$^a$ at opposite sides of its film opening 11$^a$, may have inward extensions 13$^a$ and the end portions thereof may also have inward extensions 13$^b$, the film 15$^a$ being extended at its sides over the side extensions 13$^a$ and being extended beneath the end extensions 13$^b$. In this way the film is slightly flexed as in Figure 1 and it is of course to be understood that this flexure must be in a direction reverse to that of the normal flexure of the film as it curls, for instance from the heat of the printing operation.

The gripper 10$^a$ of Figures 3 and 4 is shown flanged at one end as at 19$^a$ similar to the gripper of Figures 1 and 2 and is sufficient for effective use in a limited way in connection with cut films although I prefer the construction as outlined in Figures 1 and 2 on account of its greater adaptability, range of use and ease of operation or manipulation in the hands of one having a great deal of printing to be done.

I claim:

1. A film gripper including a frame adapted to be formed of thin sheet metal, having a main film opening and having spaced apart slits at the opposite sides of said opening, each slit including portions angularly disposed with respect to one another, said slits forming between them inwardly projecting film engaging extensions flexible in a direction parallel to the sides of the opening, the said extensions cooperating with the portions of the frame at the opposite ends of the film opening, as described.

2. A film gripper including a frame adapted to be formed of thin sheet metal, having a main film opening and having slits in spaced apart relation at the opposite sides of said opening, each slit including portions angularly disposed with respect to one another, said slits forming between them engaging extensions flexible in opposite directions parallel with and at each side of the opening, said frame also having means adjacent to the ends of the film opening, to receive portions of a film and to cooperate with the said extensions in holding the film in place.

GUSTAVE DUCLOS.